United States Patent
Ichimura et al.

(10) Patent No.: US 10,248,586 B2
(45) Date of Patent: Apr. 2, 2019

(54) INFORMATION PROCESSING APPARATUS AND DATA TRANSFER METHOD

(71) Applicant: CANON KABUSHIKI KAISHA, Tokyo (JP)

(72) Inventors: Akira Ichimura, Tokyo (JP); Takeshi Kuga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 15/162,398

(22) Filed: May 23, 2016

(65) Prior Publication Data

US 2016/0350241 A1 Dec. 1, 2016

(30) Foreign Application Priority Data

May 29, 2015 (JP) ................................. 2015-110372

(51) Int. Cl.
*G06F 13/14* (2006.01)
*G06F 13/16* (2006.01)
*G06F 13/40* (2006.01)
*G06K 15/02* (2006.01)

(52) U.S. Cl.
CPC ...... *G06F 13/1668* (2013.01); *G06F 13/4068* (2013.01); *G06K 15/1801* (2013.01); *G06K 15/1817* (2013.01)

(58) Field of Classification Search
USPC ........................................................ 710/305
See application file for complete search history.

(56) References Cited

U.S. PATENT DOCUMENTS

| | | | | |
|---|---|---|---|---|
| 5,930,359 A | * | 7/1999 | Kempke | G11C 15/00 365/49.17 |
| 2008/0028176 A1 | * | 1/2008 | Bartley | G06F 13/4239 711/167 |
| 2014/0189197 A1 | | 7/2014 | Krithivas | |

FOREIGN PATENT DOCUMENTS

| | | |
|---|---|---|
| CN | 1464736 A | 12/2003 |
| CN | 103500154 A | 1/2014 |
| JP | 2002304267 A | 10/2002 |
| JP | 2005-323159 A | 11/2005 |
| JP | 2012003591 A | 1/2012 |

* cited by examiner

*Primary Examiner* — Henry Tsai
*Assistant Examiner* — Dean Phan
(74) *Attorney, Agent, or Firm* — Canon U.S.A., Inc. IP Division

(57) ABSTRACT

An information processing apparatus includes a first, second, and third chips connected in series. The second chip includes a receiving unit, a register, a determination unit, an address translation unit, a controller unit, and a transmission unit. The receiving unit receives data and address information from the first chip. The determination unit determines whether the received address information corresponds to an address translation area based on address translation information set to the register. The address translation unit outputs translated address information to an internal bus. The controller unit controls to store data to which address information corresponding to an address area set for the second chip is attached. The transmission unit transmits to the third chip data to which address information is attached. The address translation unit translates address information corresponding to an address area set for the second chip into an address destination in the second chip.

15 Claims, 12 Drawing Sheets

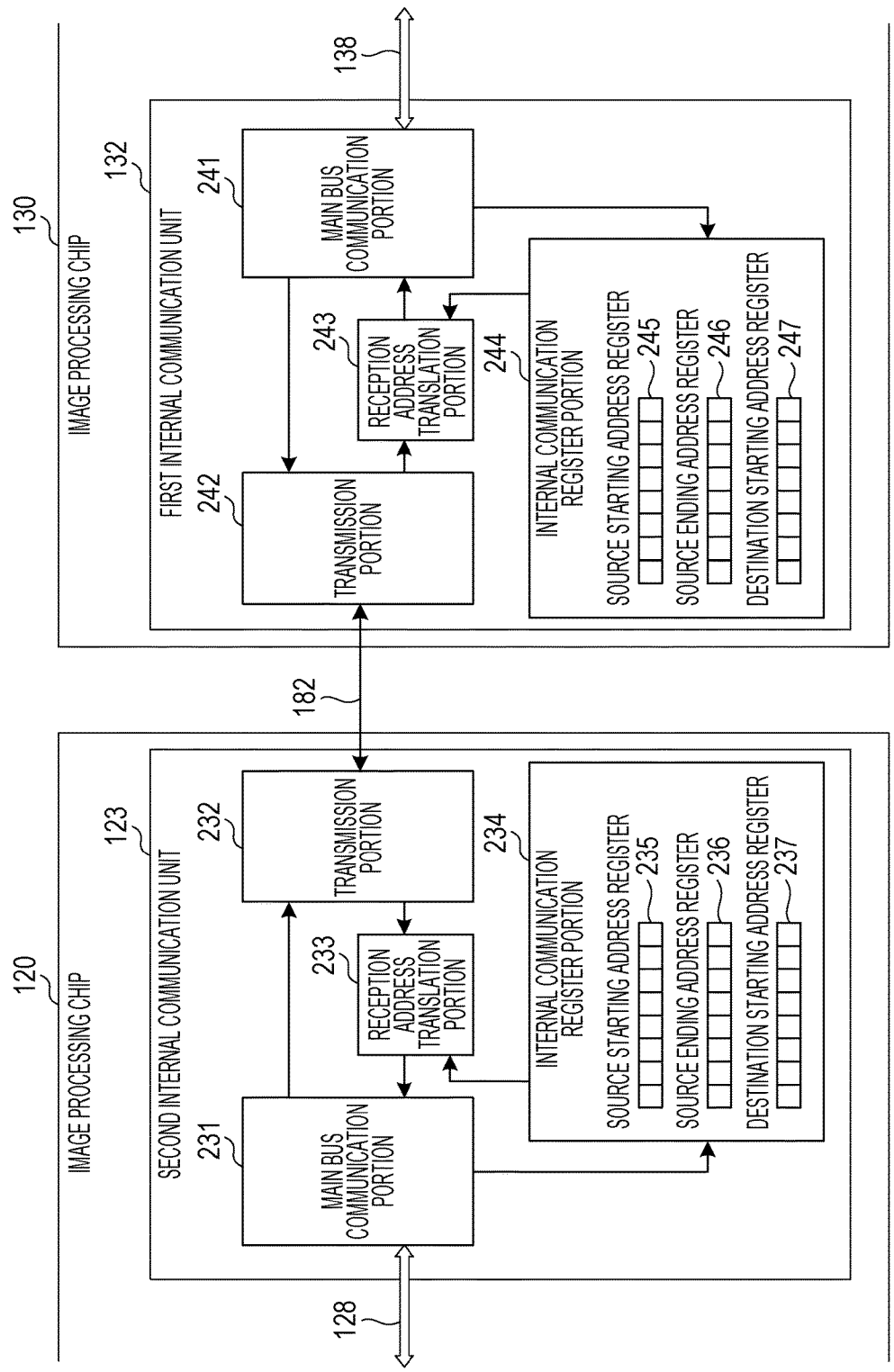

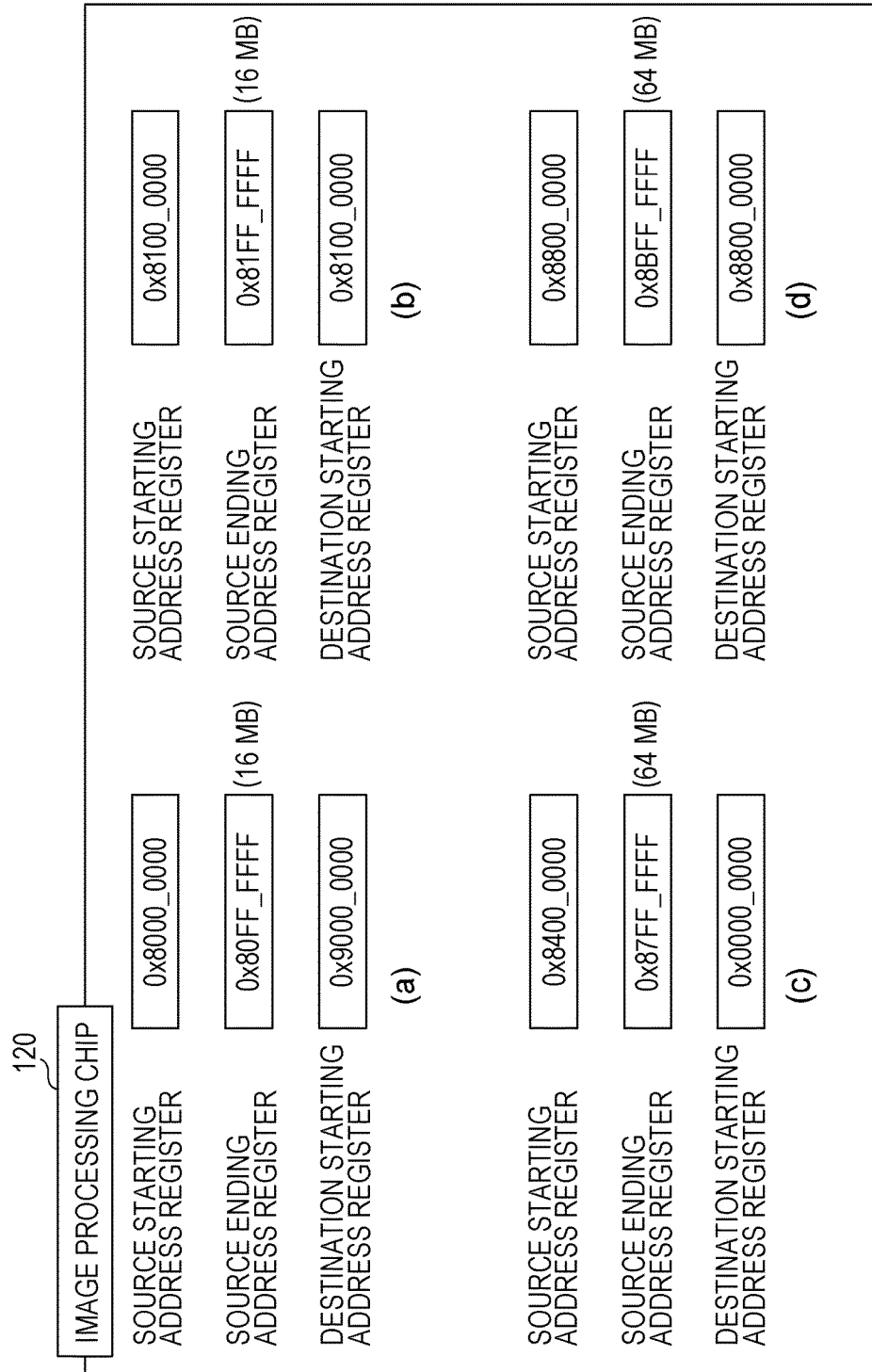

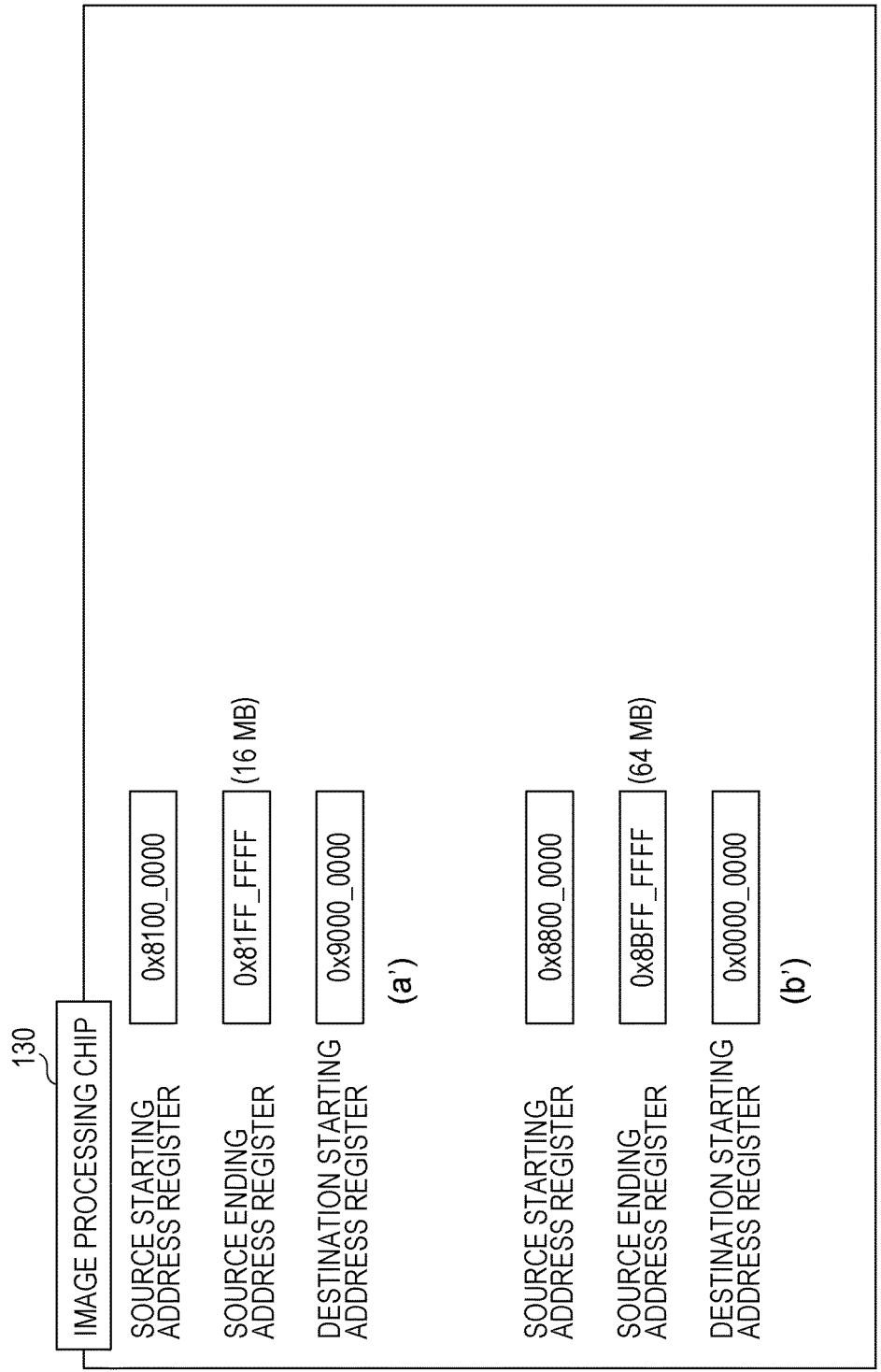

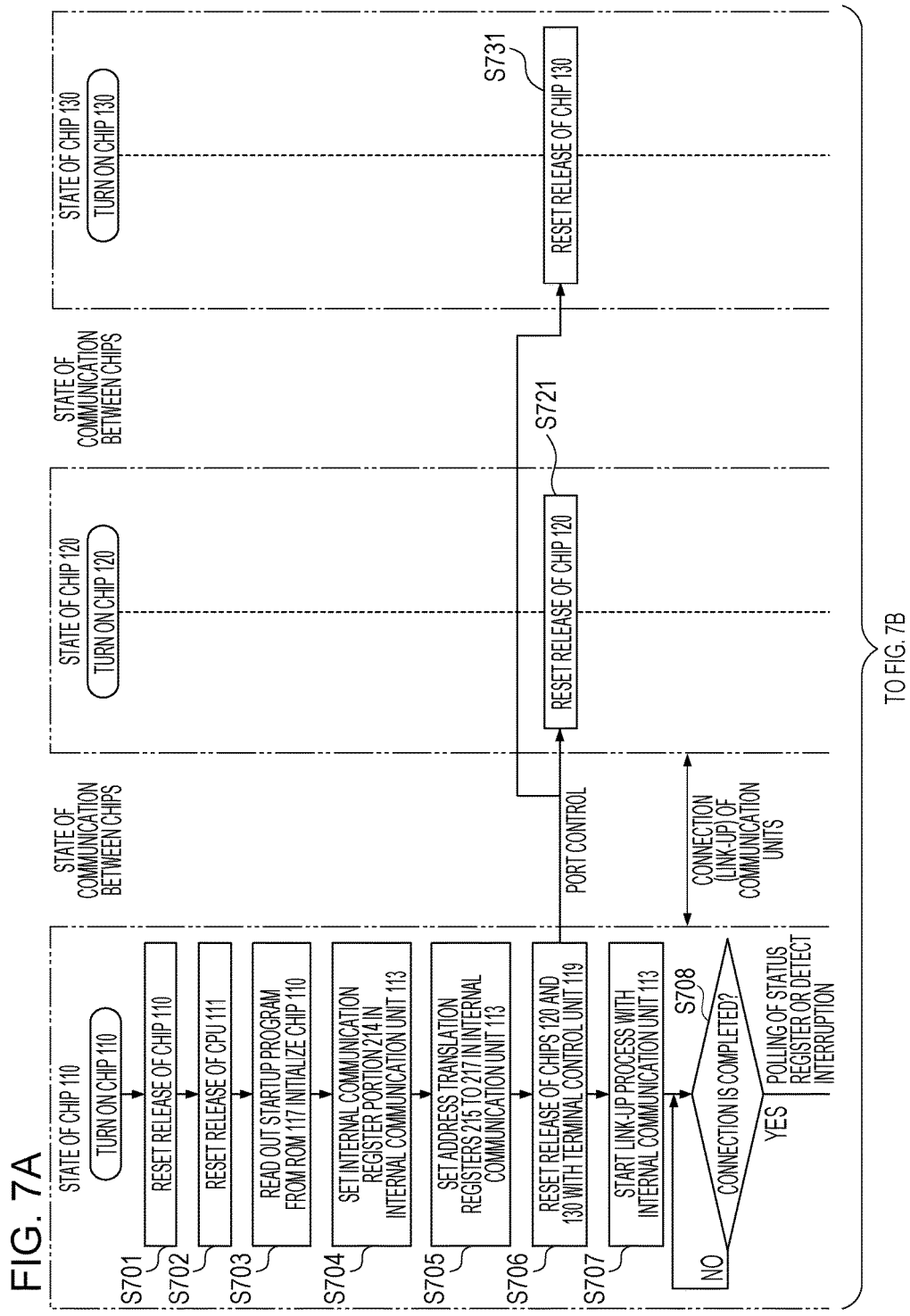

INFORMATION PROCESSING APPARATUS AND DATA TRANSFER METHOD

BACKGROUND OF THE INVENTION

Field of the Invention

The present invention relates to an information processing apparatus including multiple chips and a data transfer method.

Description of the Related Art

Increase in performance of central processing units (CPUs) and increase in size of electrical circuits have been advanced in recent years in order to support speeding up and complication of data processing. A method of increasing the number of circuits that are capable of being installed on one chip through high integration achieved by miniaturization of semiconductor processes and a method of dividing a circuit into multiple chips are known as the methods of increasing in size of the electrical circuits.

In order to increase the processing speed by dividing a circuit into multiple chips and performing the processes in parallel, it is necessary to transfer data between the chips at high speed. In order to achieve this, a method of connecting multiple image processing units using a Peripheral Component Interconnect (PCI) Express interface, which is a high-speed serial interface standard, to realize parallel image processing is proposed (refer to Japanese Patent Laid-Open No. 2005-323159).

However, since it is necessary to add PCI Express switches in order to connect the multiple image processing units to the PCI Express interface, which offers point-to-point connection, in the method disclosed in Japanese Patent Laid-Open No. 2005-323159, there is a problem in that the cost is increased.

SUMMARY OF THE INVENTION

According to an aspect of the present invention, an information processing apparatus includes a first chip, a second chip, and a third chip, wherein the first chip, the second chip, and the third chip are connected in series to each other, wherein the second chip includes a receiving unit configured to receive data and address information attached to data from the first chip, a register configured to store address translation information, a determination unit configured to determine whether the address information attached to the data received from the first chip by the receiving unit corresponds to an address translation area based on the address translation information set to the register, an address translation unit configured to translate the address information attached to the data and output the translated address information to an internal bus with the received data, a controller unit configured to control to store data to which address information corresponding to an address area set for the second chip is attached among the data received via the internal bus in a memory for the second chip, and a transmission unit configured to transmit data to which address information corresponding to an address area set for transfer to the third chip is attached among the data received via the internal bus to the third chip, and wherein the address translation unit translates address information corresponding to an address area set for the second chip into an address destination in the second chip.

Further features of the present invention will become apparent from the following description of exemplary embodiments with reference to the attached drawings.

BRIEF DESCRIPTION OF THE DRAWINGS

FIGS. 2A and 2B are block diagrams illustrating exemplary configurations of internal communication units according to the first embodiment.

FIGS. 4A and 4B illustrate examples of how to perform address translation according to the first embodiment.

FIGS. 7A to 7C are flowcharts illustrating a startup sequence of the image processing apparatus according to the first embodiment.

DESCRIPTION OF THE EMBODIMENTS

Embodiments of the present invention will herein be described with reference to the attached drawings.

First Embodiment

In a first embodiment, an image processing apparatus is exemplified as an information processing apparatus for description. The information processing apparatus is not limited to the image processing apparatus and may be any apparatus as long as the apparatus includes multiple chips and data transfer is performed between the chips. The image processing apparatus is, for example, a printer or a scanner. In addition, the image processing apparatus is, for example, a multifunctional printer, a copier, or a plotter, which has a printing function and a scanning function. A method is exemplified in the first embodiment in which the data transfer is performed from a controller chip to multiple image processing chips while performing address translation in the image processing apparatus.

Figure 1:
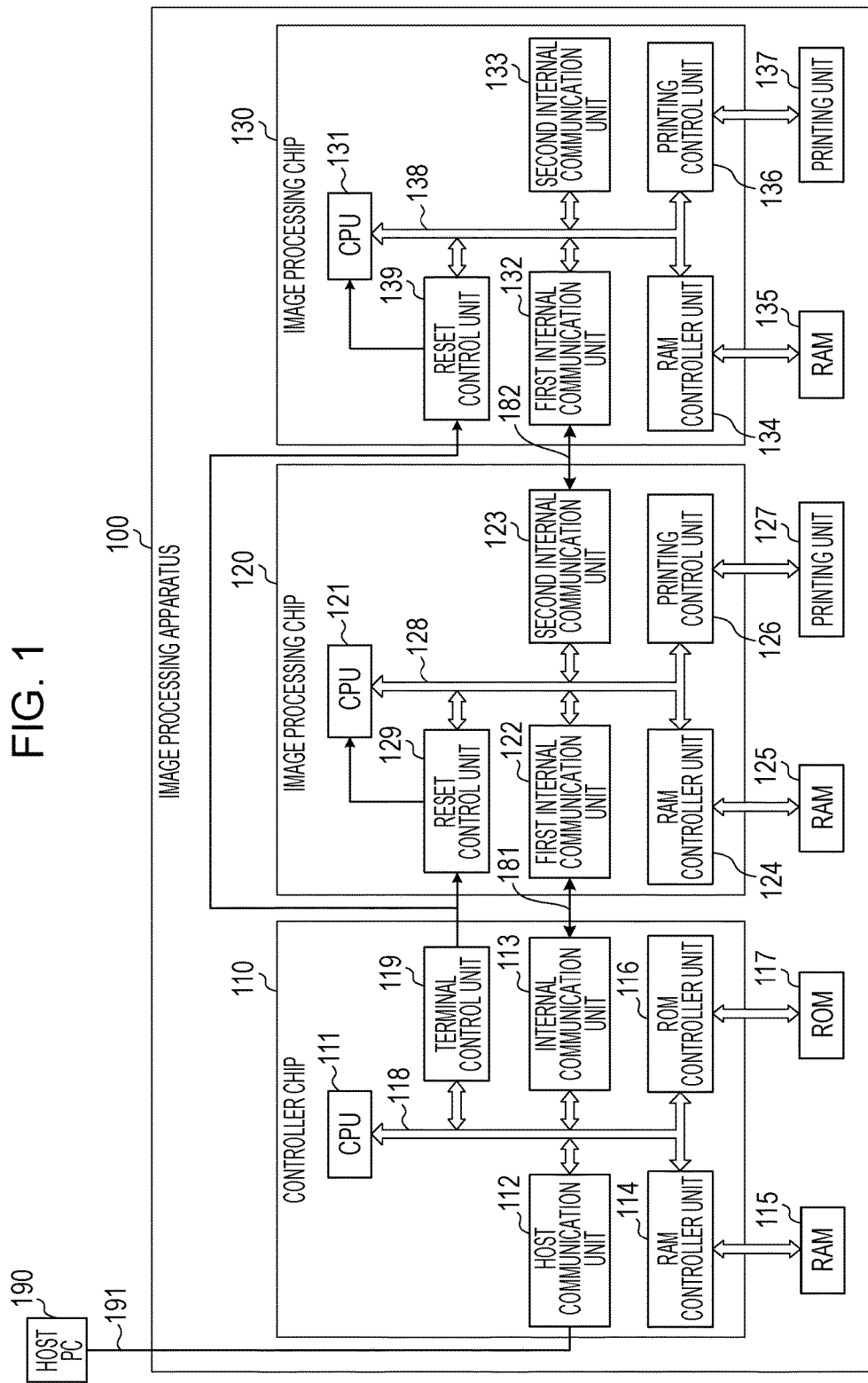
FIG. 1 is a block diagram illustrating an exemplary configuration of an image processing apparatus according to a first embodiment.

FIG. 1 is a block diagram illustrating an exemplary configuration of the image processing apparatus according to the first embodiment. A microchip (integrated circuit) is an electronic circuit typically located on one plate ("chip") of semiconductor material. As a circuit in which all or some of the circuit elements are inseparably associated and electrically interconnected so that it is considered to be indivisible for the purposes of construction and commerce, a chip can be made very compact and have up to several billion transistors and other electronic components in an area the size of a human fingernail.

Referring to FIG. 1, an image processing apparatus 100 includes a controller chip 110, an image processing chip 120, and an image processing chip 130. The image processing apparatus 100 is capable of being connected to a host personal computer (PC) 190 via a host interface 191. The image processing apparatus 100 may be connected to the host PC 190 via a network.

The host PC 190 is an external apparatus of the image processing apparatus and is capable of transmitting a variety of data including print data via the host interface 191.

The image processing apparatus 100 is capable of receiving the print data from the host PC 190 and performing printing on a recording medium (a sheet of paper) based on the received print data.

The controller chip 110 is connected to the image processing chip 120 via an internal interface 181. The image processing chip 120 is connected to the image processing chip 130 via an internal interface 182. In the first embodiment, each of the internal interface 181 and the internal interface 182 is PCI Express offering the point-to-point connection. As illustrated in FIG. 1, in the image processing apparatus 100, the controller chip 110, the image processing chip 120, and the image processing chip 130 are connected in series to each other.

The controller chip 110 includes a CPU 111, a host communication unit 112, an internal communication unit 113, a random access memory (RAM) controller unit 114, a read only memory (ROM) controller unit 116, and a terminal control unit 119. The CPU 111, the host communication unit 112, the internal communication unit 113, the RAM controller unit 114, the ROM controller unit 116, and the terminal control unit 119 are connected to each other via a main bus 118 in the controller chip 110.

The CPU 111 controls the controller chip 110 in accordance with programs stored in a ROM 117.

The host communication unit 112 communicates with the host PC 190 via the host interface 191. For example, the host communication unit 112 transmits and receives the print data to and from the host PC 190 and receives an instruction to control the image processing apparatus 100 from the host PC 190. The internal communication unit 113 communicates with the image processing chip 120 via the internal interface 181 for transmission and reception of data and control.

The RAM controller unit 114 is connected to a RAM 115 provided outside the controller chip 110 via a system bus and controls reading from the RAM 115 and writing into the RAM 115. The RAM 115 is a storage unit that stores temporary data, such as image data that is being processed. The RAM 115 is a dynamic random access memory (DRAM) in the first embodiment.

The ROM controller unit 116 is connected to the ROM 117 provided outside the controller chip 110 via the system bus and controls reading from the ROM 117. The ROM 117 stores programs executed by the CPU 111 and programs executed by a CPU 121 in the image processing chip 120 and a CPU 131 in the image processing chip 130 described below.

The main bus 118 is an internal bus of the controller chip 110. Data is capable of being transferred to each component in the controller chip 110 via the main bus 118.

The terminal control unit 119 controls resetting of the CPU 121 in the image processing chip 120 and the CPU 131 in the image processing chip 130 described below.

An address is allocated in advance to each of the host communication unit 112, the internal communication unit 113, the RAM controller unit 114, the ROM controller unit 116, and the terminal control unit 119. Each of the host communication unit 112, the internal communication unit 113, the RAM controller unit 114, the ROM controller unit 116, and the terminal control unit 119 includes an identification unit that determines whether the transferred data is for the own address based on the allocated address. For example, when the CPU 111 submits a request to write and transfer data to a certain address to the main bus 118, either of the host communication unit 112, the internal communication unit 113, the RAM controller unit 114, the ROM controller unit 116, and the terminal control unit 119 determines that the writing and transfer request is for the own address and acquires the address in the writing and transfer request and data corresponding to the address.

The image processing chip 120 includes the CPU 121, a first internal communication unit 122, a second internal communication unit 123, a RAM controller unit 124, a printing control unit 126, and a reset control unit 129. The CPU 121, the first internal communication unit 122, the second internal communication unit 123, the RAM controller unit 124, the printing control unit 126, and the reset control unit 129 are connected to each other via a main bus 128.

The CPU 121 controls the image processing chip 120 in accordance with programs.

The first internal communication unit 122 communicates with the controller chip 110 via the internal interface 181. The second internal communication unit 123 communicates with the image processing chip 130 via the internal interface 182.

The RAM controller unit 124 is connected to a RAM 125 provided outside the image processing chip 120 via a system bus and controls reading from the RAM 125 and writing into the RAM 125. The RAM 125 is a storage unit that stores temporary data, such as image data that is being processed.

The printing control unit 126 controls a printing unit 127. The printing unit 127 causes ink or toner to adhere to a medium, such as a sheet of paper, based on the print data to generate a printed product.

The main bus 128 is an internal bus of the image processing chip 120. Data is capable of transferred to each component in the image processing chip 120 via the main bus 128. The reset control unit 129 includes a register (not shown in FIG. 1) to receive an address translated from a different address in the first internal communication unit 122. The reset control unit 129 may release a resetting of the CPU 121 based on the received address.

The image processing chip 130 includes the CPU 131, a first internal communication unit 132, a second internal communication unit 133, a RAM controller unit 134, a printing control unit 136, and a reset control unit 139. The CPU 131, the first internal communication unit 132, the second internal communication unit 133, the RAM controller unit 134, the printing control unit 136, and the reset control unit 139 are connected to each other via a main bus 138.

The CPU 131 controls the image processing chip 130 in accordance with programs.

The first internal communication unit 132 communicates with the image processing chip 120 via the internal interface 182.

The RAM controller unit 134 is connected to a RAM 135 provided outside the image processing chip 130 via a system bus and controls reading from the RAM 135 and writing into the RAM 135. The RAM 135 is a storage unit that stores temporary data, such as image data that is being processed.

The printing control unit 136 controls a printing unit 137. The printing unit 137 causes ink or toner to adhere to a medium, such as a sheet of paper, based on the print data to generate a printed product.

The image processing chip 130 differs from the image processing chip 120 in that, where the second internal communication unit 123 in the image processing chip 120 communicates with the image processing chip 130, the second internal communication unit 133 in the image processing chip 130 has no chip to which the second internal communication unit 133 is connected.

The main bus 138 is an internal bus of the image processing chip 130. Data is capable of transferred to each component in the image processing chip 130 via the main bus 138.

Although the controller chip 110 differs from the image processing chips 120 and 130 in configuration in the first embodiment, the chips that are connected in series to each other may have the same configuration. In this case, for example, chips having the functions of the controller chip 110 and the image processing chips 120 and 130 may be used.

Figure 2A:
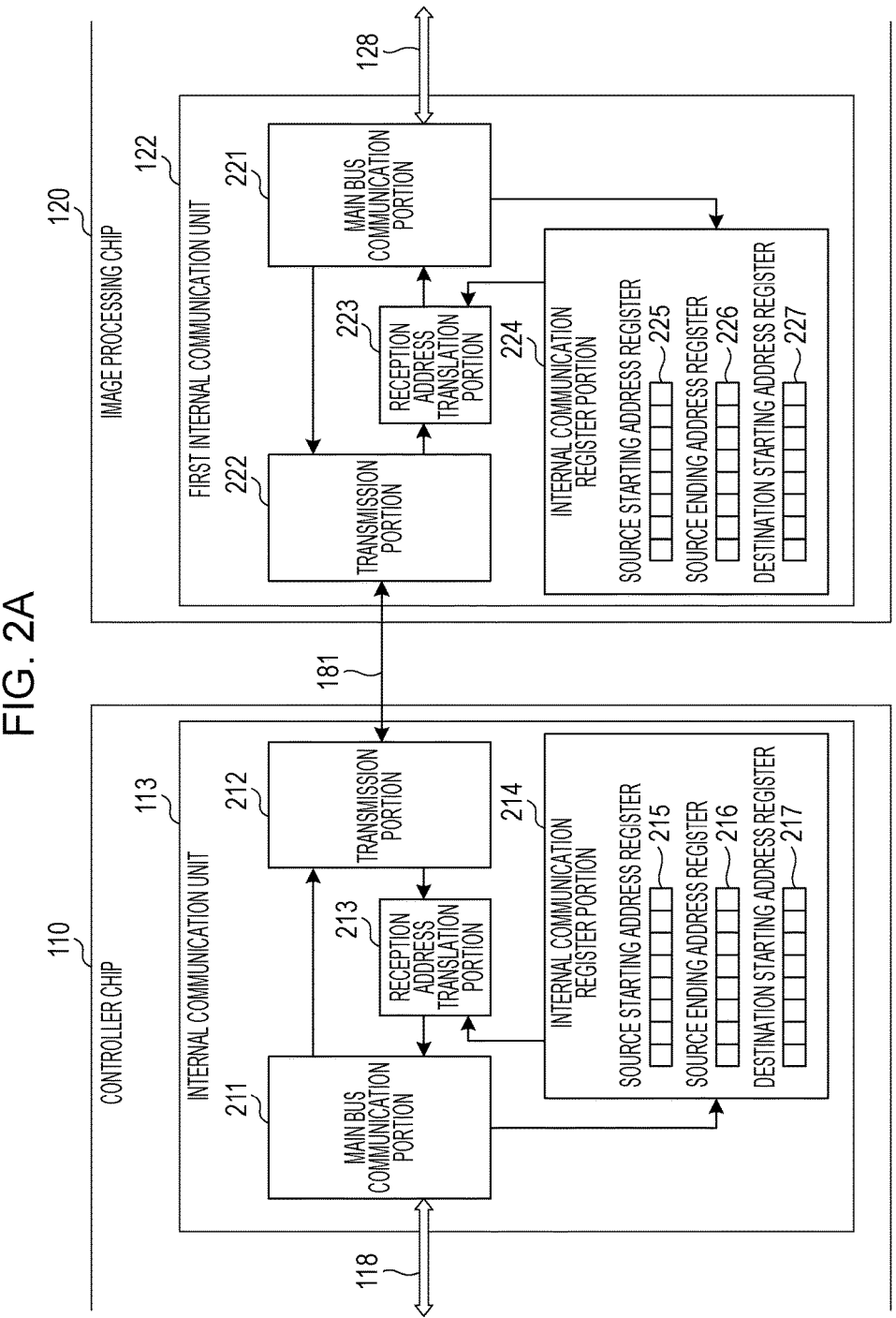

The image processing apparatus according to the first embodiment is a printer and each of the printing unit 127 and the printing unit 137 composes part of a print head. The printing unit 127 and the printing unit 137 perform different processes based on data. For example, the printing unit 127 and the printing unit 137 may perform processes for different colors or may perform processes for different areas in an image of the same color. However, the printing unit 127 and the printing unit 137 are not limited to the above ones. As described above, the image processing performed by the image processing chip 120 is different from the image processing performed by the image processing chip 130 in the first embodiment. FIGS. 2A and 2B are block diagrams illustrating exemplary configurations of the internal communication units in the respective chips according to the first embodiment.

The configuration of the internal communication unit 113 in the controller chip 110 and the configuration of the first internal communication unit 122 in the image processing chip 120 will now be described with reference to FIG. 2A.

The internal communication unit 113 in the controller chip 110 includes a main bus communication portion 211, a transmission portion 212, a reception address translation portion 213, and an internal communication register portion 214. The internal communication register portion 214 includes a source starting address register 215, a source ending address register 216, and a destination starting address register 217. In general, a register is a small amount of fast storage acting as a quickly accessible location available to a digital processor's CPU.

The configuration of the first internal communication unit 122 in the image processing chip 120 is the same as that of the internal communication unit 113 in the controller chip 110. Specifically, the first internal communication unit 122 includes a main bus communication portion 221, a transmission portion 222, a reception address translation portion 223, and an internal communication register portion 224. The internal communication register portion 224 includes a source starting address register 225, a source ending address register 226, and a destination starting address register 227.

The transmission portion 212 in the internal communication unit 113 is connected to the transmission portion 222 in the first internal communication unit 122 via the internal interface 181.

The data transfer without a PCI Express switch from the controller chip 110 to the image processing chip 120 will now be described. The main bus communication portion 211 transfers data acquired from the main bus 118 in the controller chip 110 to the transmission portion 212. Address information is included in (is attached to) the data acquired from the main bus 118 and the address information and the data are directly transferred to the transmission portion 212. The data and the address information are transferred from the transmission portion 212 to the transmission portion 222 in the image processing chip 120 via the internal interface 181, and the data and the address information are transferred from the transmission portion 222 to the reception address translation portion 223.

The reception address translation portion 223 performs an operation to translate a specific area in the transferred address information into another address area. The reception address translation portion 223 determines whether the input address corresponds to the area to be translated using the address setting in the source starting address register 225 and the address setting in the source ending address register 226 in the internal communication register portion 224. If the input address corresponds to the area to be translated, the reception address translation portion 223 translates the address information in the area to be translated into other address information in accordance with the setting value in the destination starting address register 227. Each chip is capable of translating multiple address spaces because the chip includes the multiple registers, which will be described in detail below. Each register in the internal communication register portion 224 is accessible from both the internal interface 181 and the main bus 128.

After the translation of the address information, the reception address translation portion 223 outputs the translated address information and the data and transfers the address information and the data to the main bus communication portion 221. The main bus communication portion 221 transfers the translated address information and the data to the main bus 128.

With the configuration described above, the data transmitted from the controller chip 110 is capable of being transferred to a desired address area in the image processing chip 120. The reception address translation portion 213 and the internal communication register portion 214 in the internal communication unit 113 in the controller chip 110 are the same as the reception address translation portion 223 and the internal communication register portion 224 in the first internal communication unit 122 in the image processing chip 120.

The configuration of the second internal communication unit 123 in the image processing chip 120 and the configuration of the first internal communication unit 132 in the image processing chip 130 will now be described with reference to FIG. 2B.

The second internal communication unit 123 in the image processing chip 120 includes a main bus communication portion 231, a transmission portion 232, a reception address translation portion 233, and an internal communication register portion 234. The internal communication register portion 234 includes a source starting address register 235, a source ending address register 236, and a destination starting address register 237.

The configuration of the first internal communication unit 132 in the image processing chip 130 is the same as that of the first internal communication unit 122 in the image processing chip 120. Specifically, the first internal communication unit 132 includes a main bus communication portion 241, a transmission portion 242, a reception address translation portion 243, and an internal communication register portion 244. The internal communication register portion 244 includes a source starting address register 245, a source ending address register 246, and a destination starting address register 247.

The transmission portion 232 in the second internal communication unit 123 is connected to the transmission portion 242 in the first internal communication unit 132 via the internal interface 182.

In addition, the second internal communication unit 123 in the image processing chip 120 has the same configuration as that of the internal communication unit 113 in the controller chip 110 described above. The first internal communication unit 132 in the image processing chip 130 has the same configuration as that of the first internal communication unit 122 in the image processing chip 120.

How to map memory spaces and how to perform the address translation in the first embodiment will now be described with reference to FIG. 3, FIGS. 4A and 4B, and FIG. 5.

Figure 3:
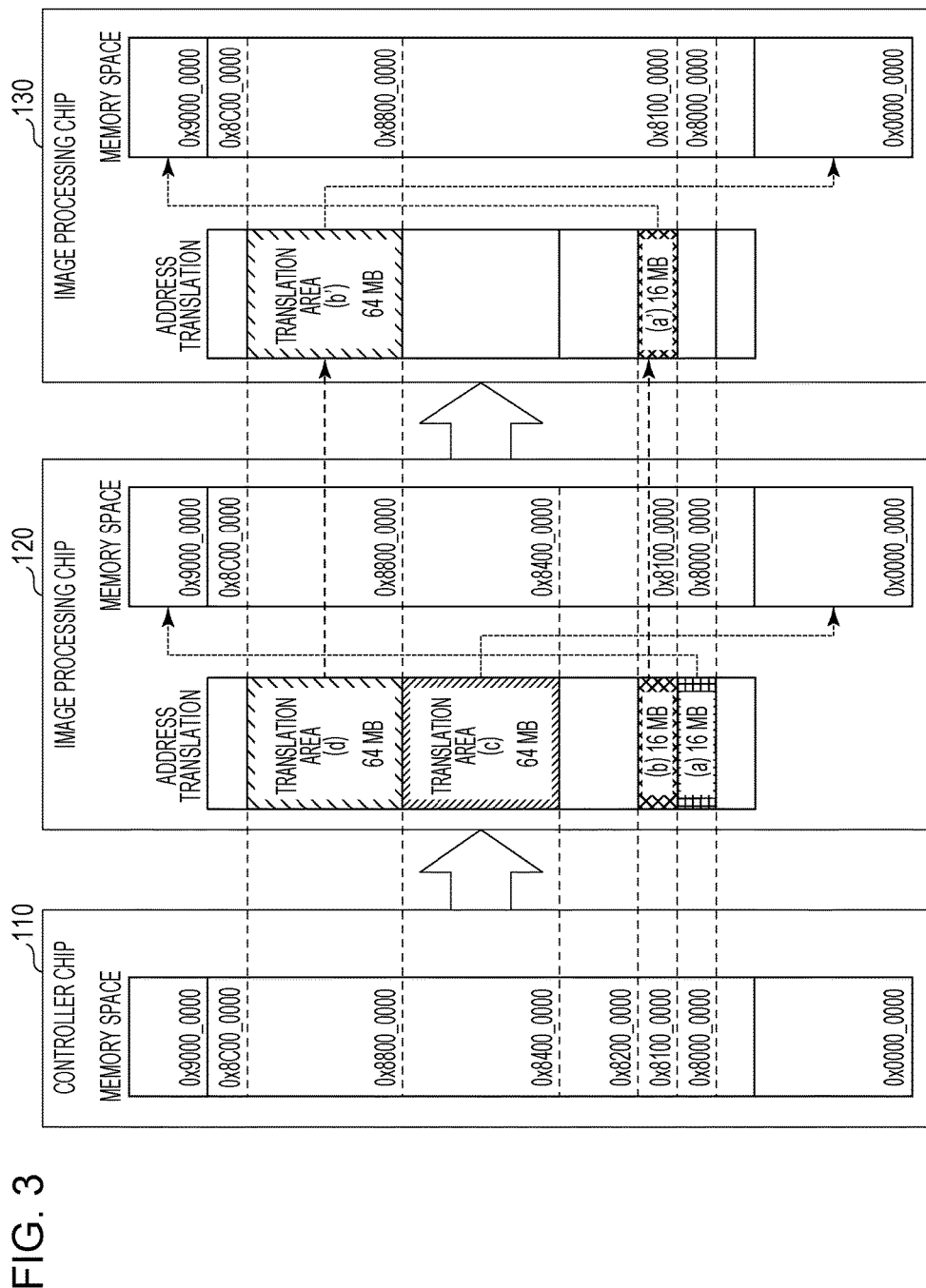
FIG. 3 illustrates an example of how to map memory spaces according to the first embodiment.

FIG. 3 illustrates an example of how to map memory spaces in the first embodiment. The memory spaces of the controller chip 110, the image processing chip 120, and the image processing chip 130 illustrated in FIG. 3 indicate address maps of the main bus 118, the main bus 128, and the main bus 138 in the controller chip 110, the image processing chip 120, and the image processing chip 130, respectively.

In the memory space of the main bus 118 in the controller chip 110, an area from 0x8000_0000 to 0x8C00_0000 is allocated in advance to the internal communication unit 113. In addition, in the memory space of the main bus 118 in the controller chip 110, an area from 0x9000_0000 to 0x90FF_FFFF is allocated in advance to a register for internal circuits in the controller chip 110. The internal circuits include the host communication unit 112, the internal communication unit 113, the RAM controller unit 114, the ROM controller unit 116, and the terminal control unit 119. An area from 0xF000_0000 to 0xFFFF_FFFF is allocated in advance to the ROM controller unit 116. The memory space of the PCI Express of the controller chip 110 is allocated for the image processing chip 120 and the image processing chip 130, which will be described in detail below.

In the memory space of the main bus 128 in the image processing chip 120, an area from 0x8000_0000 to 0x8C00_0000 is allocated in advance to the second internal communication unit 123. In addition, in the memory space of the main bus 128 in the image processing chip 120, an area from 0x9000_0000 to 0x90FF_FFFF is allocated in advance to a register for internal circuits in the image processing chip 120. An area from 0x0000_0000 to 0x3FFF_FFFF is allocated in advance to the RAM controller unit 124.

In the memory space of the main bus 138 in the image processing chip 130, an area from 0x8000_0000 to 0x8C00_0000 is allocated in advance to the second internal communication unit 133. In addition, in the memory space of the main bus 138 in the image processing chip 130, an area from 0x9000_0000 to 0x90FF_FFFF is allocated in advance to a register for internal circuits in the image processing chip 130. An area from 0x0000_0000 to 0x3FFF_FFFF is allocated in advance to the RAM controller unit 134.

Each chip having the above configuration accesses a certain memory space depending on the transfer destination and transfers certain data. Upon reception of data, each chip determines with the first internal communication unit 122 or 132 whether the data is transferred to a space of the own chip or to a space of a chip subsequent to the own chip based on the address information. Specifically, each chip translates (rewrites) the address information based on the address information and translation information set in the internal communication register portion in the chip in advance.

In the memory space of the main bus 118 in the controller chip 110, the area from 0xF000_0000 to 0xFFFF_FFFF is identified as access to the ROM 117. For example, when the CPU 111 submits a request to read and transfer data to 0xF000_0000 to the main bus 118, the ROM controller unit 116 determines that the request is for the own chip, acquires the address in the reading and transfer request, and reads out data from the ROM 117.

In the memory space of the main bus 118 in the controller chip 110, the area from 0x8000_0000 to 0x8C00_0000 is identified as access to the internal communication unit 113. For example, when the CPU 111 submits the request to write and transfer data to 0x8400_0000 to the main bus 118, the internal communication unit 113 determines that the request is for the own chip and acquires the address in the writing and transfer request and data corresponding to the address.

The address and the data that are acquired are transferred from the main bus communication portion 211 to the transmission portion 212 in the internal communication unit 113 and are transmitted to the image processing chip 120 via the internal interface 181. The address here is 0x8400_0000 and is the same as that on the main bus 118. The address and the data are transferred from the transmission portion 222 to the reception address translation portion 223 in the first internal communication unit 122 in the image processing chip 120.

The reception address translation portion 223 translates the transferred address based on the register settings stored in the internal communication register portion 224. The reception address translation portion 223 transfers the transferred data to the main bus communication portion 221 with the translated address. After the writing and transfer request is submitted from the main bus communication portion 221 to the main bus 128, the transfer from the controller chip 110 to the image processing chip 120 is completed. FIGS. 4A and 4B illustrate examples of how to perform the address translation in the reception address translation portions in the first embodiment. The register configuration of the internal communication register portion 224 in the first internal communication unit 122 in the image processing chip 120 and how to perform the address translation in the reception address translation portion 223 will be described here.

Figure 5:
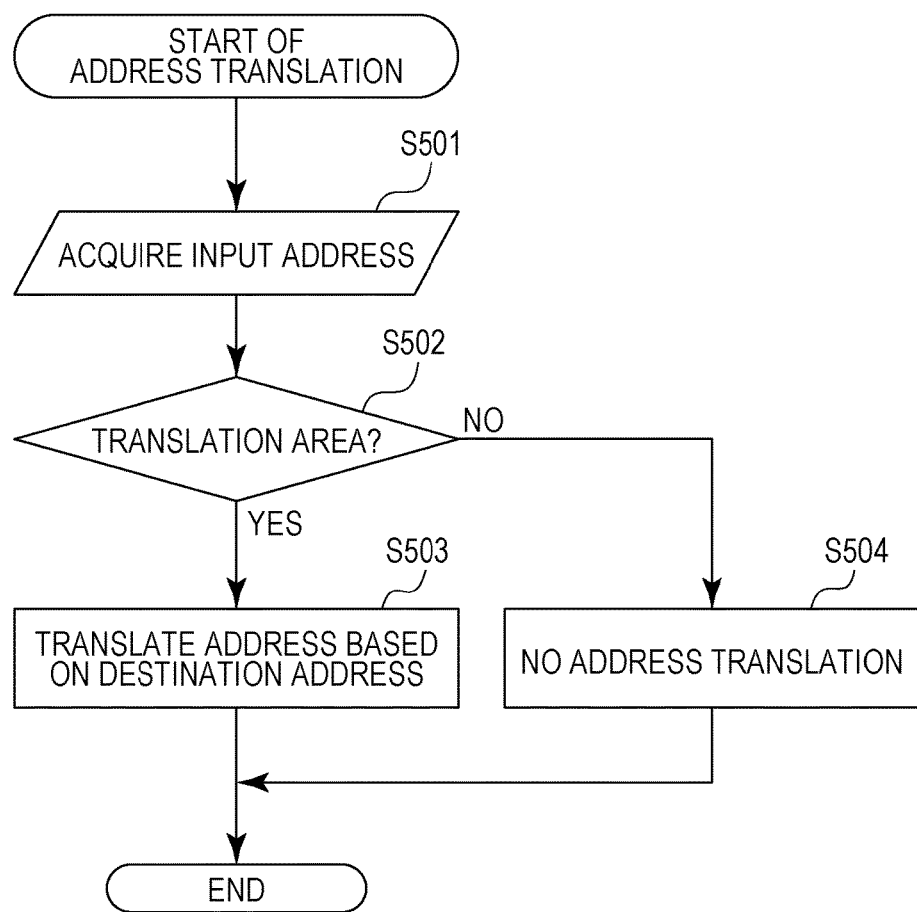
FIG. 5 is a flowchart illustrating an exemplary process of translating an address according to the first embodiment.

Referring to FIG. 4A, (a) illustrates exemplary settings in the address translation in a 16-MB space from 0x8000_0000 to 0x80FF_FFFF. A source starting address 0x8000_0000 is set in the source starting address register 225 and a source ending address 0x80FF_FFFF is set in the source ending address register 226. A destination starting address 0x9000_0000 is set in the destination starting address register 227. With the above settings, the 16-MB space from 0x8000_0000 to 0x80FF_FFFF is translated into 0x9000_0000 to 0x90FF_FFFF. The CPU 111 or the CPU 121 sets destination addresses for the registers in the image processing chip 120 in accordance with the content of processing to the transfer data. FIG. 5 is a flowchart illustrating an exemplary process of translating an address, which is performed by the reception address translation portion 223.

Referring to FIG. 5, in Step S501, the reception address translation portion 223 acquires an address that is input.

In Step S502, the reception address translation portion 223 determines whether the address acquired in Step S501 corresponds to an address translation area set in the internal communication register portion 224. If the following condition is met, the reception address translation portion 223 determines that the address acquired in Step S501 corresponds to the translation area.

(Source starting address)≤(Acquired address)≤(Source ending address)

If the reception address translation portion 223 determines that the address acquired in Step S501 corresponds to the translation area (YES in Step S502), in Step S503, the reception address translation portion 223 performs the address translation. The address is translated according to the following expression:

(Acquired address)−(Source starting address)+(Destination starting address)

If the reception address translation portion 233 determines that the address acquired in Step S501 does not correspond to the translation area (NO in Step S502), in Step S504, the process illustrated in FIG. 5 is terminated without translating the acquired address.

Referring to FIG. 4A, (b) illustrates exemplary settings in the address translation in a 16-MB space from 0x8100_0000 to 0x81FF_FFFF. A source starting address 0x8100_0000 is set in the source starting address register 225 and a source ending address 0x81FF_FFFF is set in the source ending address register 226. A destination starting address 0x8100_0000 is set in the destination starting address register 227. With the above settings, no translation is practically performed in the 16-MB space from 0x8100_0000 to 0x81FF_FFFF.

Referring to FIG. 4A, (c) illustrates exemplary settings in the address translation in a 64-MB space from 0x8400_0000 to 0x87FF_FFFF. A source starting address 0x8400_0000 is set in the source starting address register 225 and a source ending address 0x87FF_FFFF is set in the source ending address register 226. A destination starting address 0x0000_0000 is set in the destination starting address register 227. With the above settings, the 64-MB space from 0x8400_0000 to 0x87FF_FFFF is translated into 0x0000_0000 to 0x81FF_FFFF.

Referring to FIG. 4A, (d) illustrates exemplary settings in the address translation in a 64-MB space from 0x8800_0000 to 0x8BFF_FFFF. A source starting address 0x8800_0000 is set in the source starting address register 225 and a source ending address 0x8BFF_FFFF is set in the source ending address register 226. A destination starting address 0x8800_0000 is set in the destination starting address register 227. With the above settings, no translation is practically performed in the 64-MB space from 0x8800_0000 to 0x8BFF_FFFF.

Next, the register configuration of the internal communication register portion 244 in the first internal communication unit 132 in the image processing chip 130 and how to perform the address translation in the reception address translation portion 243 will be described.

Referring to FIG. 4B, (a') illustrates exemplary settings in the address translation in a 16-MB space from 0x8100_0000 to 0x81FF_FFFF. A source starting address 0x8100_0000 is set in the source starting address register 245 and a source ending address 0x81FF_FFFF is set in the source ending address register 246. A destination starting address 0x9000_0000 is set in the destination starting address register 247. With the above settings, the 16-MB space from 0x8100_0000 to 0x81FF_FFFF is translated into 0x9000_0000 to 0x90FF_FFFF.

Referring to FIG. 4B, (b') illustrates exemplary settings in the address translation in a 64-MB space from 0x8800_0000 to 0x8BFF_FFFF. A source starting address 0x8800_0000 is set in the source starting address register 245 and a source ending address 0x8BFF_FFFF is set in the source ending address register 246. A destination starting address 0x0000_0000 is set in the destination starting address register 247. With the above settings, the 64-MB space from 0x8800_0000 to 0x8BFF_FFFF is translated into 0x0000_0000 to 0x90FF_FFFF.

As described above, the pieces of address translation information including the address information in the source starting address register, the address information in the source ending address register, and the address information in the destination starting address register are stored in the internal communication register portion in each chip.

How to perform the address translation in accordance with the settings in the internal communication register portion will now be described with reference to FIG. 3 and FIGS. 4A and 4B. As illustrated in FIG. 4A, pieces of information concerning the address translation for the four areas in the memory space of the main bus 128 are set in the internal communication register portion 224 in the image processing chip 120. The settings in (a) in FIG. 4A correspond to a translation area (a) in FIG. 3, the settings in (b) in FIG. 4A correspond to a translation area (b) in FIG. 3, the settings in (c) in FIG. 4A correspond to a translation area (c) in FIG. 3, and the settings in (d) in FIG. 4A correspond to a translation area (d) in FIG. 3.

First, a path through which data is transferred from the controller chip 110 to the image processing chip 120 will be described. As described above, the settings in the address translation in (a) in FIG. 4A correspond to the translation area (a) in FIG. 3. Upon occurrence of the data transfer to an address 0x8000_0010 in the controller chip 110, the transmission portion 212 transfers the address information and the data to the image processing chip 120 via the internal interface 181 as the transfer to 0x8000_0010. In the image processing chip 120, the reception address translation portion 223 determines that the address 0x8000_0010 corresponds to the translation area and translates the address 0x8000_0010 into 0x9000_0010. The data is transferred from the controller chip 110 to the address 0x9000_0010 in the image processing chip 120 in the above manner.

As described above, the settings in the address translation in (c) in FIG. 4A correspond to the translation area (c) in FIG. 3. Upon occurrence of the data transfer to an address 0x8400_0010 in the controller chip 110, the transmission portion 212 transfers the address information and the data to the image processing chip 120 via the internal interface 181 as the transfer to 0x8400_0010. In the image processing chip 120, the reception address translation portion 223 determines that the address 0x8400_0010 corresponds to the translation area and translates the address 0x8400_0010 into 0x0000_0010. In other words, the address 0x8400_0010 corresponds to an address area set for own chip (the image processing chip 120) in the internal communication register portion 224 and is translated into the address 0x0000_0010 in the own chip. The data is transferred to the RAM controller unit 124 via the main bus communication portion 221 and the main bus 128. The RAM controller unit 124 stores the data in the RAM 125. The data stored in the RAM 125 is read out via the RAM controller unit 124, is subjected to certain processing in, for example, the printing control unit 126 in the image processing chip 120, and is transmitted to the printing unit 127. In other words, the RAM controller unit 124 determines that the address information that has been translated into 0x0000_0010 and has been transferred to the main bus 128 via the main bus communication portion 221 corresponds to the own chip.

Next, a path through which data is transferred from the controller chip 110 to the image processing chip 130 via the image processing chip 120 will be described.

As illustrated in FIG. 4B, pieces of information concerning the address translation for the two areas in the memory space of the main bus 138 are set in the internal communication register portion 244 in the image processing chip 130.

These settings are used to translate the addresses for the data transfer received from the image processing chip 120 in the reception address translation portion 243 in the image processing chip 130. The settings in (a') in FIG. 4B correspond to a translation area (a') in FIG. 3 and the settings in (b') in FIG. 4B correspond to a translation area (b') in FIG. 3. The data transfer path using the translation area (b) and the translation area (a') will now be described. Upon occurrence of the data transfer to an address 0x8100_0020 in the controller chip 110, the transmission portion 212 transfers the address information and the data to the image processing chip 120 via the internal interface 181 as the transfer to 0x8100_0020.

In the image processing chip 120, the reception address translation portion 223 determines that the address 0x8100_0020 corresponds to the translation area and translates the address 0x8100_0020 into 0x8100_0020 (e.g., no translation is practically performed in the 16-MB space from 0x8100_0000 to 0x81FF_FFFF). The data transferred to 0x8100_0020 is transmitted to the image processing chip 130 via the main bus 128, the second internal communication unit 123, and the internal interface 182.

In the image processing chip 130, the reception address translation portion 243 determines that the address 0x8100_0020 corresponds to the translation area and translates the address 0x8100_0020 into 0x9000_0020. The data transferred to 0x9000_0020 is transferred to the address 0x9000_0020 in the image processing chip 130 via the main bus 138. The data is capable of being transferred from the controller chip 110 to the address 0x9000_0020 in the image processing chip 130 through the above path.

Similarly, the transfer from the controller chip 110 to the address 0x0000_0000 in the image processing chip 130, illustrated in FIG. 3, is also capable of being performed via the translation area (d) in the image processing chip 120 and the translation area (b') in the image processing chip 130. The data transferred to 0x0000_0000 is transferred to the RAM controller unit 134 via the main bus 138. The RAM controller unit 134 stores the data in the RAM 135. The data stored in the RAM 135 is read out via the RAM controller unit 134, is subjected to certain processing in, for example, the printing control unit 136 in the image processing chip 130, and is transmitted to the printing unit 137.

In the first embodiment, combination of the multiple address translation operations in the multi-chip configuration in which the multiple chips area connected in series to each other allows the data transfer between chips via an intermediated chip and the data transfer between adjacent chips to be efficiently performed.

More specifically, even in the case in which the multiple chips are connected in series to each other, the address translation allows data to be transferred to a desired chip without using any switch or the like, such as a PCI Express switch, or without intervening firmware. The data to be transferred to the next image processing chip 130 is capable of being transferred to the image processing chip 130 without being stored in the RAM 125 corresponding to the image processing chip 120.

A case will now be described with reference to FIGS. 6A and 6B in which the destination address is dynamically changed in the image processing apparatus according to the first embodiment.

The destination address set in the internal communication register portion is changed after the transfer of data in this case.

First, the data transfer from the controller chip 110 to the image processing chip 120 will be described. In order to transfer the data allocated to the address space from 0x8400_0000 to 0x87FF_FFFF in the controller chip 110 to 0x0000_0000 in the image processing chip 120, the destination address of the translation area (c) is set to a translation area (c'). Since this setting is similar to the translation area (c) in the image processing chip 120 illustrated in FIG. 4A, a description of this setting is omitted herein. With this setting, first data allocated to the address space from 0x8400_0000 to 0x87FF_FFFF in the controller chip 110 is capable of being transferred to the space from 0x0000_0000 to 0x03FF_FFFF in the image processing chip 120.

The destination address of the translation area (c) is changed to the setting values in a translation area (c") after the first data is transferred in the above manner. The destination address is changed from 0x0000_0000 to 0x0400_0000. Then, after the change of the destination address, second data allocated to the address space from 0x8400_0000 to 0x87FF_FFFF in the controller chip 110 is transferred. The second data allocated to the address space from 0x8400_0000 to 0x87FF_FFFF in the controller chip 110 is capable of being transferred to a 64-MB space from 0x0400_0000 in the image processing chip 120.

Next, the data transfer from the controller chip 110 to the image processing chip 130 will be described.

Settings are made to transfer the data allocated to the address space from 0x8800_0000 to 0x8BFF_FFFF in the controller chip 110 to the image processing chip 130 via the image processing chip 120. The settings in the translation area (d) in the image processing chip 120 are used without change and the destination address of the translation area (b) in the image processing chip 130 is set to the translation area (b'). Since this setting is similar to the translation area (d) in the image processing chip 120 illustrated in FIG. 4A and the translation area (b') in the image processing chip 130 illustrated in FIG. 4B, a description of this setting is omitted herein. With this setting, first data allocated to the address space from 0x8800_0000 to 0x8BFF_FFFF in the controller chip 110 is capable of being transferred to a 64-MB space from 0x0000_0000 in the image processing chip 130.

The CPU 111 or the CPU 121 changes the settings in the translation area (b') to setting values in a translation area (b") based on the data after the first data is transferred in the above manner. Specifically, the destination address is changed from 0x0000_0000 to 0x4000_0000. Then, after the change of the destination address, second data allocated to the address space from 0x8800_0000 to 0x8BFF_FFFF in the controller chip 110 is transferred. The second data is capable of being transferred to a 64-MB space from 0x0400_0000 in the image processing chip 130 via the image processing chip 120.

As described above, changing the destination address of the registers in the internal communication register portion after the data transfer allows the data transfer to an area (a total of 128 MB) larger than the address space of 64 MB in the transfer from the controller chip 110 to the image processing chip 130. Similarly, also in the transfer from the controller chip 110 to the image processing chip 120, use of the settings in the translation area (c') and the setting values in the translation area (C") allows the data transfer to an area larger than the address space of 64 MB.

In other words, dynamically changing the destination address allows the amount of data exceeding that in the address translation area to be transferred between the chips.

An exemplary sequence of the image processing apparatus 100 will now be described with reference to FIGS. 7A to 7C.

Figure 7B:
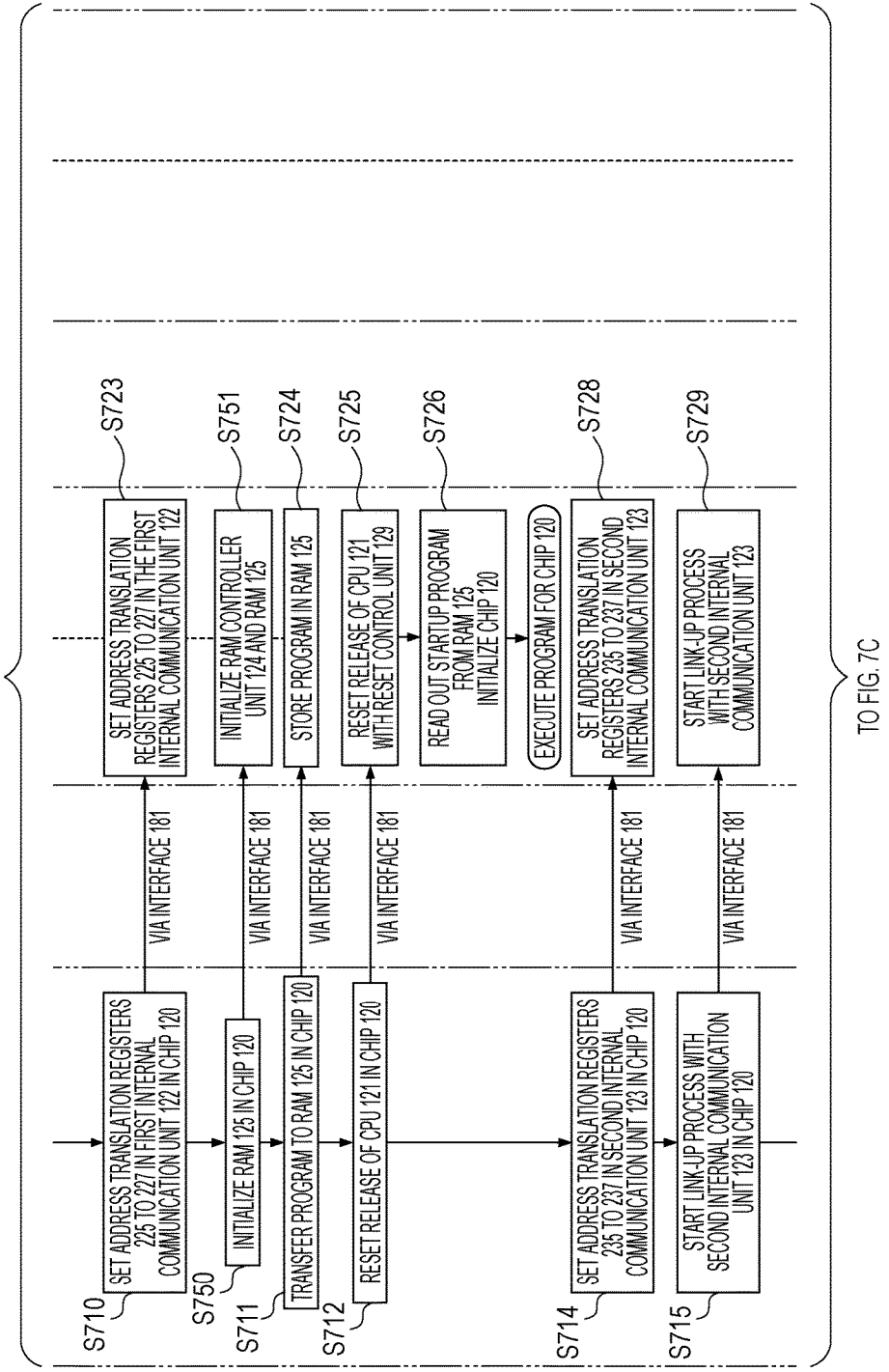
Figure 7C:
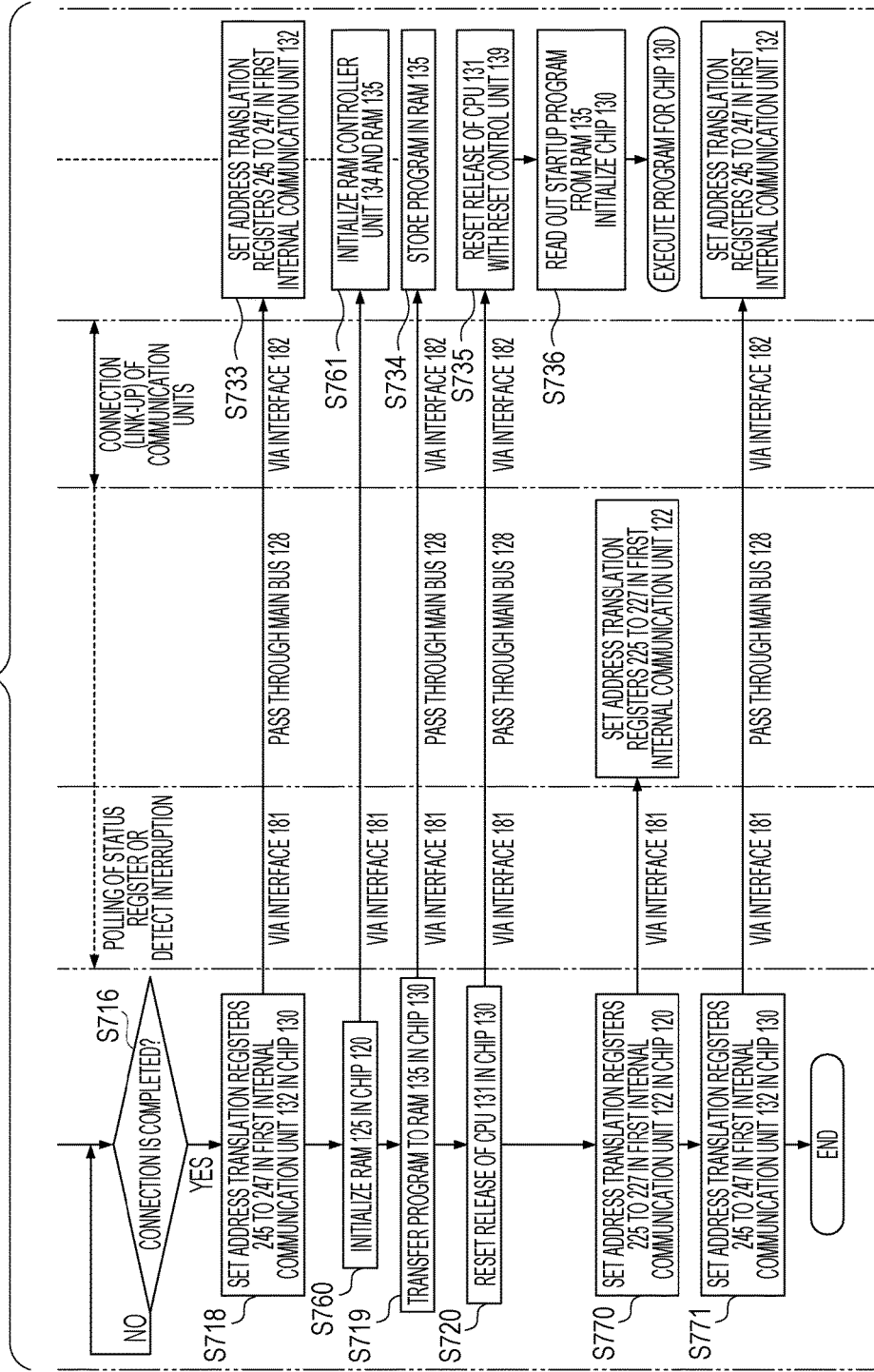

FIGS. 7A to 7C are flowcharts illustrating a startup sequence of the image processing apparatus 100.

Upon turning on of the controller chip 110, the image processing chip 120, and the image processing chip 130, the startup sequence is started. The chips are in a communication state in response to the turning on of the controller chip 110, the image processing chip 120, and the image processing chip 130.

Referring to FIG. 7A, in Step S701, a reset signal connected to a reset terminal of the controller chip 110 is changed from a Low level to a High level when the power state of the controller chip 110 is stabilized after the turning on of the controller chip 110. As a result, the resetting of the controller chip 110 is released.

In Step S702, the resetting of the CPU 111 in the controller chip 110 is released in response to the reset release of the controller chip 110.

In Step S703, the CPU 111 the resetting of which has been released reads out a startup program from the ROM 117 to initialize the controller chip 110.

In Step S704, the internal communication register portion 214 in the internal communication unit 113 is set. In Step S705, the source starting address register 215 to the destination starting address register 217 for the address translation in the internal communication unit 113 are set. These settings are used in a case in which data is transferred from the image processing chip 120 or the image processing chip 130 to the controller chip 110. Data is capable of being transferred from the image processing chip 120 or the image processing chip 130 to the controller chip 110 in the same manner as in the transfer of data from the controller chip 110 to the image processing chip 120 and the image processing chip 130.

In Step S706, the CPU 111 causes the terminal control unit 119 in the controller chip 110 to set ports of the controller chip, which are connected to reset terminals of the image processing chip 120 and the image processing chip 130, from a Low level to a High level.

In Step S721, the resetting of the image processing chip 120 is released. In Step S731, the resetting of the image processing chip 130 is released. Upon release of the resetting of the image processing chip 120 and the image processing chip 130, the first internal communication unit 122 in the image processing chip 120 is in a state in which training to link to the internal interface 181 is repeated and the first internal communication unit 132 in the image processing chip 130 is in a state in which training to link to the internal interface 182 is repeated.

In Step S707, the CPU 111 in the controller chip 110 sets the internal communication unit 113 so as to start a link-up process with the internal interface 181. The internal communication unit 113 in the controller chip 110 and the first internal communication unit 122 in the image processing chip 120 start the PCI Express link-up process via the internal interface 181.

In Step S708, it is determined whether the link-up process is completed. If the link-up process is completed (YES in Step S708) and the communication with the internal interface 181 is ready, the sequence goes to Step S710 in FIG. 7B.

Referring to FIG. 7B, in Step 710 and Step S723, the CPU 111 in the controller chip 110 sets the source starting address register 225 to the destination starting address register 227 for the address translation in the first internal communication unit 122 in the image processing chip 120 via the internal interface 181. For example, the settings in (a) in FIG. 4A are used here.

In Step S750, the RAM 125 in the image processing chip 120 is initialized. The initialization is performed by submitting the transfer request from the CPU 111 to an address 0x8000_0100. The transfer is performed by translating the address 0x8000_0100 into an address 0x9000_0100 by the reception address translation portion 223 in the image processing chip 120 via the internal interface 181 and writing the address 0x9000_0100 into the register in the RAM controller unit 124 in the image processing chip 120.

In Step S751, the RAM controller unit 124 and the RAM 125 are initialized in accordance with the setting value written in Step S750. This makes the RAM 125 available.

In Step S711, program data for the image processing chip 120 is transferred to an address 0x0000_0000 in the image processing chip 120. Specifically, the data stored in the ROM 117 is transferred from the controller chip 110 to the image processing chip 120 using the address 0x8400_0000 as a staring address.

Figure 6A:
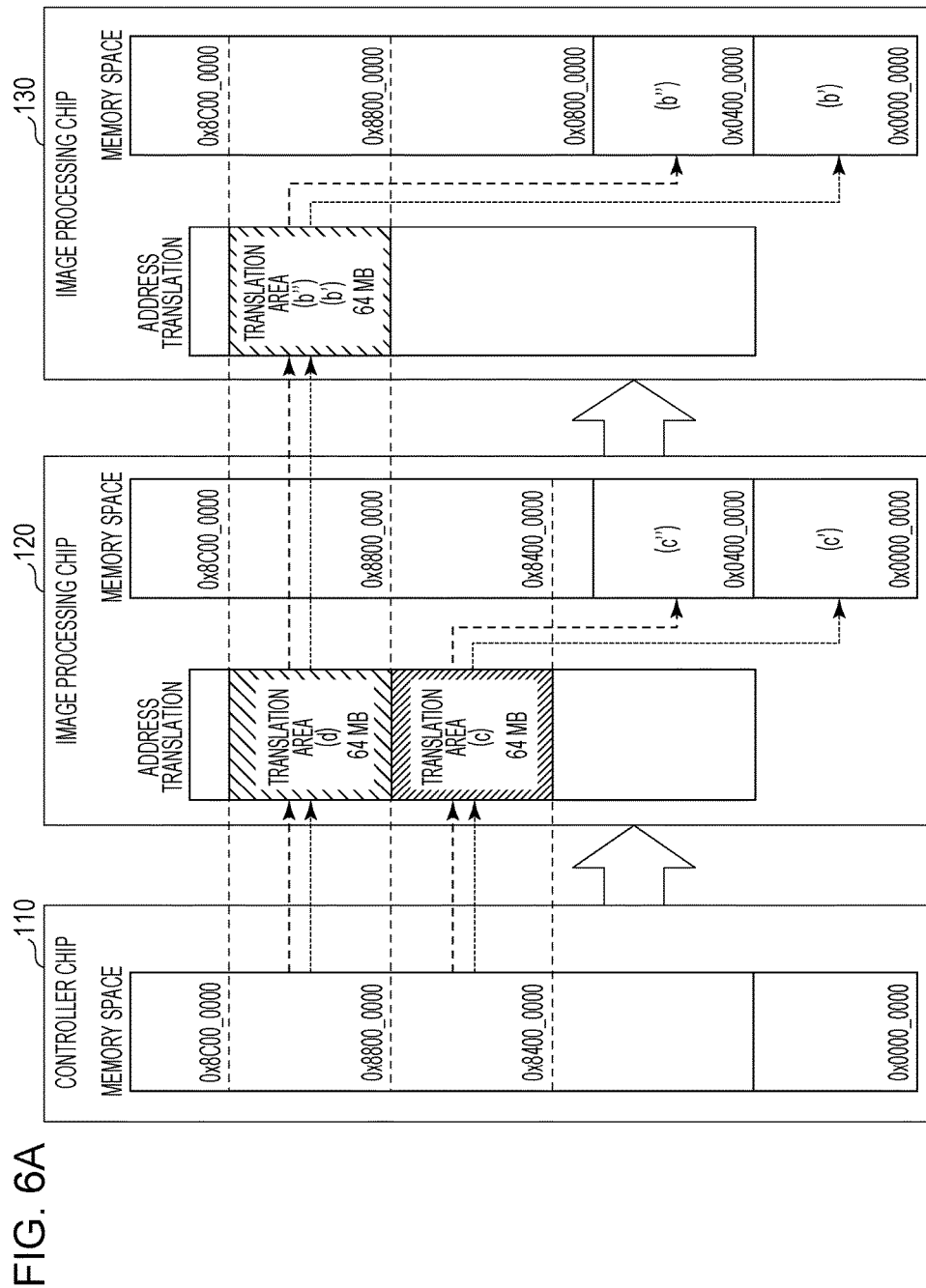
FIGS. 6A and 6B illustrate an example of how to map memory spaces according to the first embodiment.
Figure 6B:
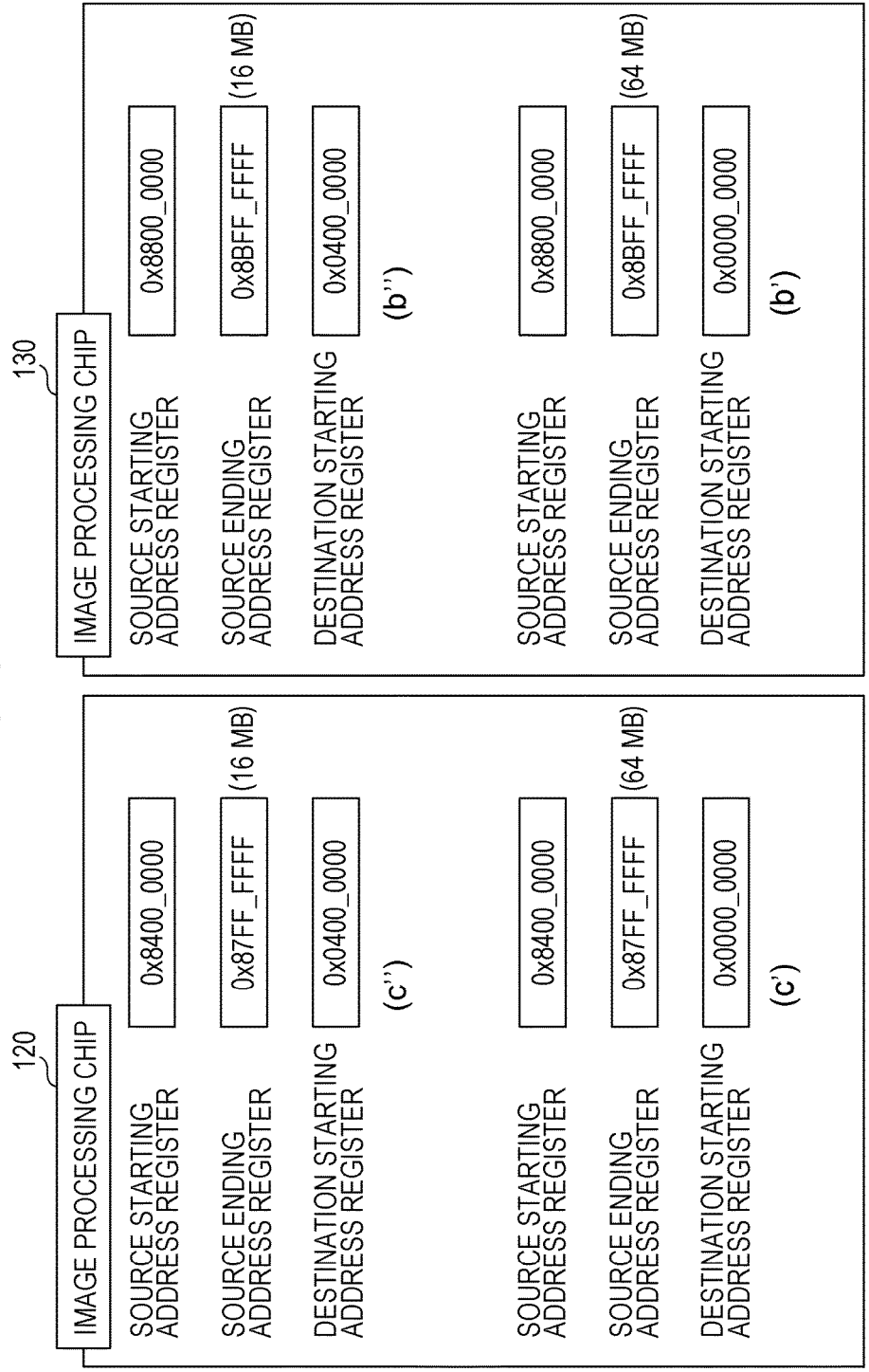

In Step S724, the program data is written into an address space from the address 0x0000_0000 in the image processing chip 120 through the address translation, as illustrated in FIGS. 6A and 6B. The address space from the address 0x0000_0000 is mapped to the RAM controller unit 124 connected to the main bus 128 and is finally written into the RAM 125. The address 0x0000_0000 corresponds to a boot vector of the CPU 121 in the image processing chip 120.

In Step S712, the CPU 111 in the controller chip 110 releases the resetting of the CPU 121 in the image processing chip 120. Specifically, the transfer request is submitted from the CPU 111 to the address 0x8000_00000. The transfer is performed by translating the address 0x8000_00000 into the address 0x9000_0000 by the reception address translation portion 223 in the image processing chip 120 via the internal interface 181 and writing the address 0x9000_0000 into the register in the reset control unit 129 in the image processing chip 120. In Step S725, the reset control unit 129 releases the resetting of the CPU 121 based on the written data.

In Step S726, the CPU 121 the resetting of which has been released reads out a startup program stored in the RAM 125 to initialize the image processing chip 120.

The CPU 111 in the controller chip 110 and the CPU 121 in the image processing chip 120 are in a state in which the CPU 111 and the CPU 121 are capable of operating in accordance with the programs through the previous steps.

Next, the image processing chip 130 is started.

Since Steps from S714 to S720 for the image processing chip 130, which are performed by the controller chip 110 and which are illustrated in FIG. 7B and FIG. 7C, are similar to Steps from S705 to Step S712 for the image processing chip 120 described above, which are performed by the controller chip 110, a description of Steps from S714 to S720 is omitted herein. In Step S770, the CPU 111 changes the address translation settings in the image processing chip 120. Specifically, the CPU 111 changes the address translation settings from the settings in the translation area (c') to the settings in the translation area (c") in FIG. 6B. Changing the address translation settings to the predetermined values in accordance with the content of the data processing allows the data to be transferred to an area that is not the program area.

In Step S771, the address translation settings in the image processing chip 130 are changed. Specifically, the settings in (b') are changed to the settings in (b") in FIG. 6B. Changing the address translation settings allows the data to be transferred to an area that is not the program area.

In the first embodiment, it is possible to start up the three chips with one ROM. In addition, changing the address translation settings for program transfer to the address translation settings for data transfer allows an image data transfer area between the chips to be ensured.

According to the first embodiment, it is possible to increase the processing speed while keeping the low cost by using the multiple chips.

OTHER EMBODIMENTS

The present invention is not limited to the above embodiment. For example, although the configuration in which the three chips are connected to each other is described in the above embodiment, the present invention is not limited to this configuration. The present invention is applicable to a configuration in which four or more chips are used.

Although the address translation portions are provided at the reception side in the above embodiment, the arrangement of the address translation portions is not limited to this. The address translation portions may be provided for transmission.

Although the transfer from the controller chip is described in the above embodiment, the transfer is not limited to this. For example, the present invention is applicable to transfer from an image processing chip 1 to a main chip. The present invention is also applicable to transfer from an image processing chip 2 to the image processing chip 1 and transfer from the image processing chip 2 to the controller chip.

Although the example in which the two image processing chips have the same configuration is described in the above embodiment, the present invention is not limited to this. The image processing chips that are connected in series to each other may have different configurations.

Although the controller chip has a configuration different from those of the image processing chips in the above embodiment, the present invention is not limited to this. The controller chip and the image processing chips may have the same configuration.

Although each of the internal interfaces 181 and 182 is the PCI Express interface in the above embodiment, the present invention is not limited to this. Any interface may be used as long as peer-to-peer connection is established.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110372, filed May 29, 2015, which is hereby incorporated by reference herein in its entirety.

What is claimed is:

1. An information processing apparatus comprising:
a first chip;
a second chip; and
a third chip,
wherein the first chip, the second chip, and the third chip are connected in series, wherein the second chip includes
a receiving unit configured to receive, from the first chip, data and address information attached to the data,
a register configured to store address translation information,
a determination unit configured to determine whether the address information attached to the data received by the receiving unit corresponds to an address translation area based on the address translation information set to the register,
an address translation unit configured to translate the address information attached to the data received by the receiving unit and output the translated address information to an internal bus with the data received by the receiving unit,
a controller unit configured to control to store, in a memory for the second chip, data to which address information corresponding to an address area set for the second chip is attached among the data received from the address translation unit via the internal bus, and
a transmission unit configured to transmit, to the third chip, data to which address information corresponding to an address area set for transfer to the third chip is attached among the data received from the address translation unit via the internal bus,
wherein the address translation unit translates address information corresponding to an address area set for the second chip into an address destination in the second chip.

2. The information processing apparatus according to claim 1, wherein the address translation unit outputs address information corresponding to an address area set for transfer to the third chip without changing.

3. The information processing apparatus according to claim 1, wherein address maps of the internal bus of the second chip are the same as address maps of an internal bus of the third chip.

4. The information processing apparatus according to claim 1, wherein the register changes the address translation information after transfer of one piece of data is completed.

5. The information processing apparatus according to claim 1, wherein a setting of the register is performed based on an instruction from the first chip.

6. The information processing apparatus according to claim 1, wherein the memory for the second chip is initialized by submitting a transfer request from the first chip to a predetermined address.

7. The information processing apparatus according to claim 1, wherein an address area of the data received from the first chip and an address area set for transfer to the third chip in the second chip are set in the same address area.

8. The information processing apparatus according to claim 1, wherein the second chip is connected to the first chip and the third chip through peer-to-peer connection respectively.

9. The information processing apparatus according to claim 1, wherein Peripheral Component Interconnect Express is used as a communication unit between the first chip and the second chip and a communication unit between the second chip and the third chip.

10. The information processing apparatus according to claim 1, further comprising a printing unit configured to print data processed by the second chip.

11. The information processing apparatus according to claim 1,
wherein the second chip further includes a first print control unit configured to control a first printing unit, and
wherein the third chip includes a second print control unit configured to control a second printing unit.

12. The information processing apparatus according to claim 11, wherein the first printing unit is a part of a print head and the second printing unit is a part of the print head.

13. The information processing apparatus according to claim 11, wherein the first printing unit and the second printing unit perform processes for different colors.

14. A method of controlling an information processing apparatus having a first chip, a second chip, and a third chip that are connected in series to each other, the method comprising in the second chip:
   receiving, from the first chip, data and address information attached to the data;
   storing, in a register, address translation information;
   determining whether the received address information attached to the data corresponds to an address translation area based on the address translation information set to the register;
   translating the received address information attached to the data and outputting the translated address information to an internal bus with the received data;
   controlling to store, in a memory for the second chip, data to which address information corresponding to an address area set for the second chip is attached among the data received via the internal bus; and
   transmitting, to the third chip, data to which address information corresponding to an address area set for transfer to the third chip is attached among the data received via the internal bus,
   wherein translating includes translating address information corresponding to an address area set for the second chip into an address destination in the second chip.

15. A non-transitory storage storing a program to cause a computer to perform a method of controlling an information processing apparatus having a first chip, a second chip, and a third chip that are connected in series to each other, the method comprising in the second chip:
   receiving, from the first chip, data and address information attached to the data;
   storing, in a register, address translation information;
   determining whether the received address information attached to the data corresponds to an address translation area based on the address translation information set to the register;
   translating the received address information attached to the data and outputting the translated address information to an internal bus with the received data;
   controlling to store-, in a memory for the second chip, data to which address information corresponding to an address area set for the second chip is attached among the data received via the internal bus; and
   transmitting, to the third chip, data to which address information corresponding to an address area set for transfer to the third chip is attached among the data received via the internal bus,
   wherein translating includes translating address information corresponding to an address area set for the second chip into an address destination in the second chip.

* * * * *